(12) United States Patent
Wang et al.

(10) Patent No.: US 9,850,158 B2
(45) Date of Patent: Dec. 26, 2017

(54) METHOD FOR PRODUCING SHEETS OF GLASS PHOSPHOR

(71) Applicant: TAIWAN COLOR OPTICS, INC., Taichung (TW)

(72) Inventors: Chih-Feng Wang, Taichung (TW); Yung-Peng Chang, Taichung (TW); Kuo-Yin Huang, Taichung (TW); Hsin-An Chen, Taichung (TW); Wei-Chih Cheng, Taichung (TW)

(73) Assignee: TAIWAN COLOR OPTICS, INC., Taichung (TW)

( * ) Notice: Subject to any disclaimer, the term of this patent is extended or adjusted under 35 U.S.C. 154(b) by 0 days.

(21) Appl. No.: 15/164,319

(22) Filed: May 25, 2016

(65) Prior Publication Data

US 2016/0347640 A1 Dec. 1, 2016

(30) Foreign Application Priority Data

May 26, 2015 (TW) .............................. 104116848 A

(51) Int. Cl.
| | |
|---|---|
| *C03B 19/06* | (2006.01) |
| *C03B 25/00* | (2006.01) |
| *C09K 11/02* | (2006.01) |
| *C03C 3/00* | (2006.01) |
| *C03C 4/12* | (2006.01) |

(52) U.S. Cl.
CPC .............. *C03B 19/06* (2013.01); *C03B 25/00* (2013.01); *C03C 3/00* (2013.01); *C03C 4/12* (2013.01); *C09K 11/025* (2013.01); *C03C 2204/00* (2013.01); *Y02P 40/57* (2015.11)

(58) Field of Classification Search
None
See application file for complete search history.

(56) References Cited

U.S. PATENT DOCUMENTS

| | | | | |
|---|---|---|---|---|
| 2009/0212697 A1* | 8/2009 | Nakamura | ............. | B82Y 30/00 313/506 |
| 2010/0207512 A1* | 8/2010 | Miyagawa | ......... | C09K 11/7774 313/503 |
| 2011/0227477 A1* | 9/2011 | Zhang | ..................... | B32B 18/00 313/503 |
| 2013/0049575 A1* | 2/2013 | Fujita | ........................ | C03C 8/08 313/503 |
| 2015/0008816 A1* | 1/2015 | Yoon | .................... | C09K 11/025 313/503 |
| 2016/0225966 A1* | 8/2016 | Maloney | ................ | H01L 33/502 |
| 2017/0050879 A1* | 2/2017 | Li | ......................... | H01L 33/501 |

FOREIGN PATENT DOCUMENTS

TW M474264 U 3/2014

* cited by examiner

*Primary Examiner* — Lisa L Herring
(74) *Attorney, Agent, or Firm* — Li & Cai Intellectual Property (USA) Office

(57) ABSTRACT

A method for producing sheets of glass phosphor, including following steps of: taking glass powder, phosphor powder and a bonding agent to mix to form a mixture, wherein the glass powder and the phosphor powder are mixed first, and then the glass powder and the phosphor powder are mixed with the bonding agent; compressing the mixture to form a tablet; sintering the tablet to form a glass phosphor body; cutting the glass phosphor body to form at least one sheet body.

13 Claims, 3 Drawing Sheets

METHOD FOR PRODUCING SHEETS OF GLASS PHOSPHOR

BACKGROUND OF THE INVENTION

Field of the Invention

The present invention relates to a glass phosphor body, and more particularly to a method for producing sheets of glass phosphor.

Description of the Prior Art

Usually, a common glass phosphor body is used on a light device, for example, an LED structure device disclosed in TWM474264. The LED structure device includes a glass sintering phosphor body disposed on a path of an LED light source, and the glass sintering phosphor body is a porous structure body which is formed by inorganic glass powder, red phosphor powder and yellow phosphor powder being sintered.

However, the glass sintering phosphor body mentioned above has a porous structure, and a service life of the glass sintering phosphor body may decrease due to containing too many pores. For example, when the light source produces a high energy light which projects on the pores of the glass sintering phosphor body, the pores contain air, the air may easily undergo volume thermal expansion because of being projected by the light, and the pores expand and make the glass sintering phosphor body crack and damaged. In addition, during a forming process of the glass sintering phosphor body, there may have problems like contracted sintering volume and increased material stress due to too many pores. Therefore, the objects of the present invention are to find out how to effectively improve a structural strength of the glass phosphor body to increase the service life, how to eliminate the pores and how to elevate a manufacturing yield rate.

The present invention has arisen to mitigate and/or obviate the afore-described disadvantages.

SUMMARY OF THE INVENTION

The major object of the present invention is to provide a method for producing sheets of glass phosphor, in which a bonding agent is added during a mixing process so that a mixture can be easily shaped to make a glass phosphor body be mixed uniformly, pores in the glass phosphor body can be effectively eliminated through a compressing process, and during a manufacturing process, a sintering contraction rate is decreased, the structure is strengthened, a Young's modulus is improved, a yield rate is enhanced, and a manufacturing cost is lowered. In addition, after sintering process, the glass phosphor body undergoes an annealing process to prevent the glass phosphor body from cracking easily and to repair the cracks so as to elevate a yield rate.

To achieve the above and other objects, a method for producing sheets of glass phosphor, including following steps of: taking glass powder, phosphor powder and a bonding agent to mix to form a mixture, wherein the glass powder and the phosphor powder are mixed first, and then the glass powder and the phosphor powder are mixed with the bonding agent; compressing the mixture to form a tablet; sintering the tablet to form a glass phosphor body; cutting the glass phosphor body to form at least one sheet body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
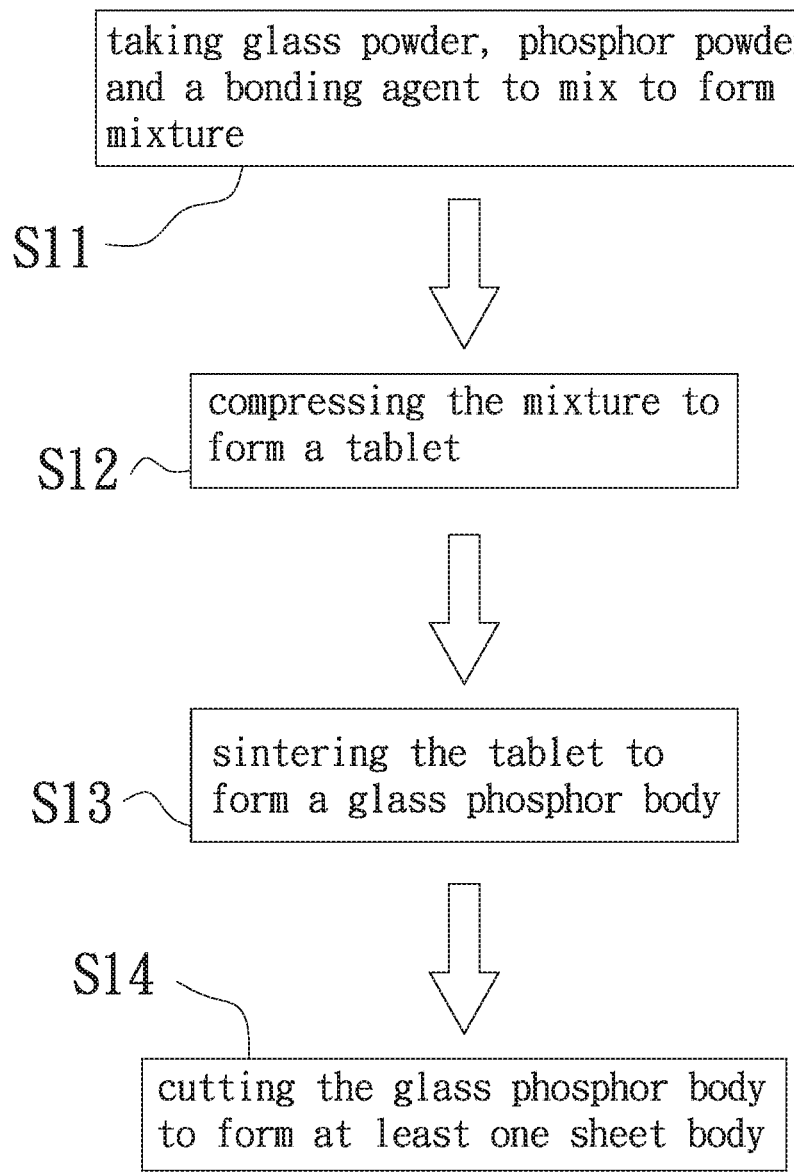
FIG. 1 is a flow chart showing a preferred embodiment of the present invention.
Figure 2:
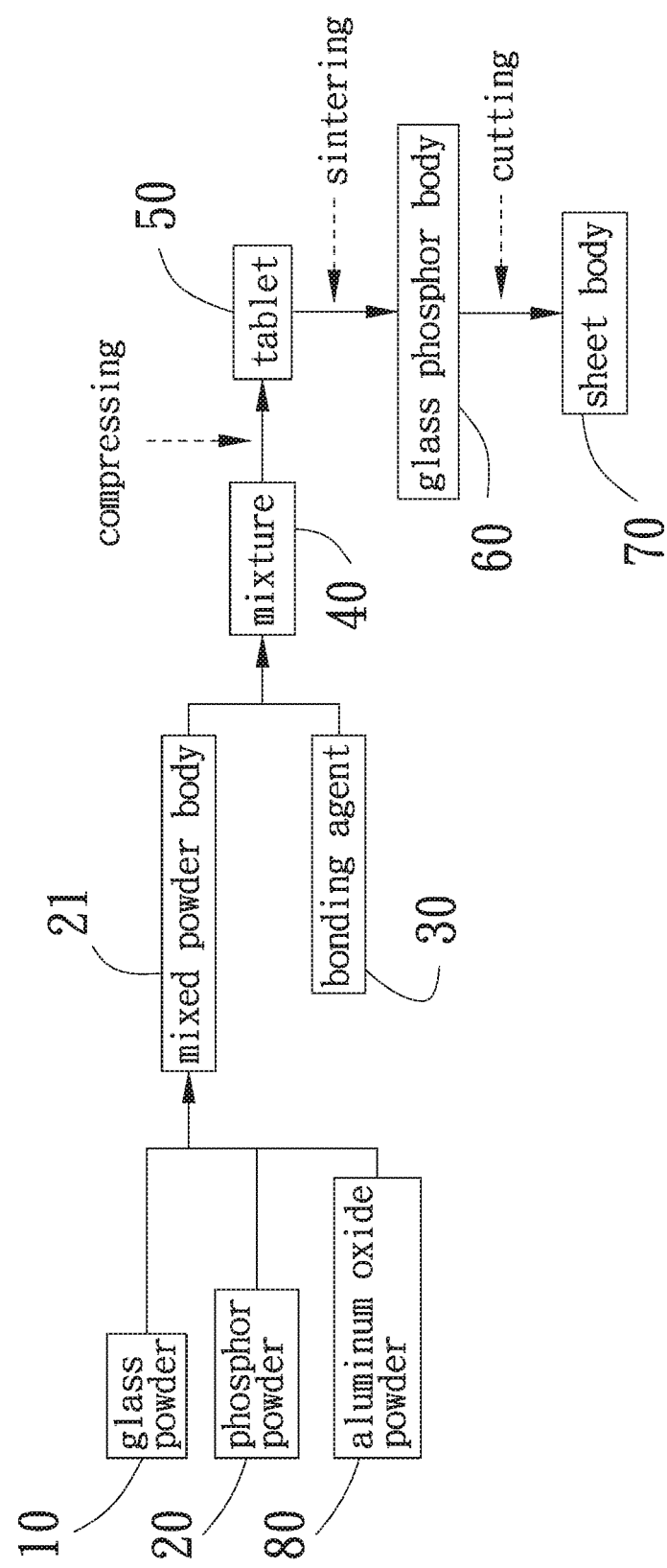
FIG. 2 is another flow chart showing the preferred embodiment of the present invention.
Figure 3:
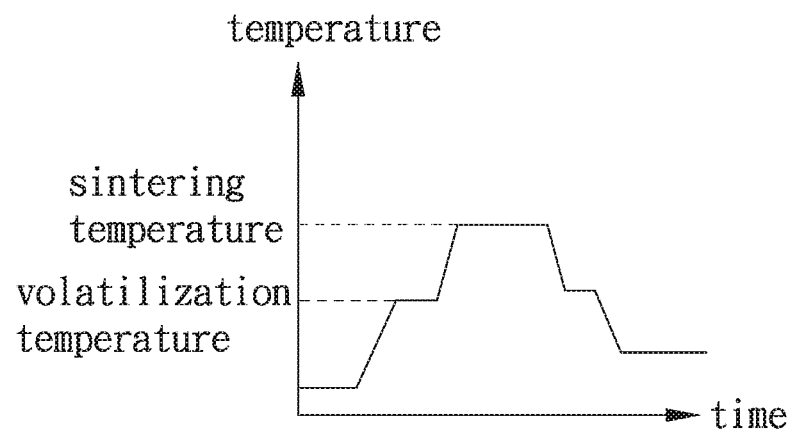
FIG. 3 is a drawing showing a temperature of the preferred embodiment of the present invention.

Please refer to FIGS. 1 to 3 for a preferred embodiment, a method for producing sheets of glass phosphor is provided, including following steps.

Step S11: taking glass powder 10, phosphor powder 20 and a bonding agent 30 to mix to form a mixture 40; step S12: compressing the mixture 40 to form a tablet 50; step S13: sintering the tablet 50 to form a glass phosphor body 60; and step S14: cutting the glass phosphor body 60 to form at least one sheet body 70.

The glass powder 10 may include silicate, phosphate, borate or tellurate, and a grain diameter of grains of the glass powder 10 is between 100 nm to 100000 nm. Specifically, the grains of the glass powder 10 may be ground through a vibration grinding device so as to make the grain diameter of the glass powder 10 to meet a user's requirement. More specifically, the glass powder 10 which is ground can be sieved through a sieving device (for example, a sieve screen with a predetermined mesh diameter) so that a size of the grains of the glass powder 10 may be more precise and more uniformed. The phosphor powder 20 may include yttrium aluminum garnet (YAG), nitride or silicate, and a grain diameter of grains of the phosphor powder 20 is between 100 nm to 100000 nm, and the grains of the phosphor powder 20 can also be ground and sieved in the above-mentioned way.

In this embodiment, firstly, the glass powder 10 and the phosphor powder 20 are mixed. Specifically, a weight of the glass powder 10 and a weight of the phosphor powder 20 are in a proportion, one of the phosphor powder 20 and the glass powder 10 takes up 1% to 99% of a total volume of the phosphor powder 20 the glass powder 10, and the other one of the phosphor powder 20 and the glass powder 10 takes up the rest of the total volume. When the glass powder 10 and the phosphor powder 20 are mixed, the glass powder 10 and the phosphor powder 20 may be stirred and mixed with a stirring device so that the glass powder 10 and the phosphor powder 20 can be mixed more uniformly, and the more similar of the gains of the glass powder 10 and the grains of the phosphor powder 20 in dimension, the greater mixing effect of the glass powder 10 and the phosphor powder 20 can be created. In addition, the glass powder 10 and the phosphor powder 20 are mixed with aluminum oxide powder 80 before being mixed with bonding agent 30, a weight proportion of the phosphor powder 20, the glass powder 10 and the aluminum oxide powder 80 may be 10:85:5, or the aluminum oxide powder 80 may take up 5% to 7% of a total volume of the mixture 40.

After the glass powder 10 and the phosphor powder 20 are mixed to form a mixed powder body 21, the mixed powder body 21 is mixed with the bonding agent 30 to form the mixture 40. The bonding agent 30 may be a liquid bonding agent which is volatilizable, the bonding agent 30 may be composed of a plurality of materials (for example, organic or inorganic materials), the materials may include polymer resin, PE, PP or PS, and the bonding agent 30 may further include wax or vegetable oil for solving the problem that the materials cannot be degreased easily and increasing a moisture and a flowability of the mixed powder body 21. It is to be noted that the bonding agent 30 is viscous so that the mixture 40 is flowable, deformable and shapable; therefore, the mixture 40 can be shaped into a predetermined shape, for example, round, square or irregular. In addition, the bonding agent 30 may increase a mixing effect of the glass powder 10 and the phosphor powder 20. More specifically, the bonding agent 30 can maintain a mixed state of the glass powder 10 and the phosphor powder 20 after the glass powder 10 and the phosphor powder 20 are mixed so as to maintain an uniformity of the mixture 40, to fill up a gap between the glass powder 10 and the phosphor powder 20 and to decrease air in the mixture 40.

The mixture 40 may be compressed by a compressing device to form a tablet. For example, the compressing device may include a compressing mold, the mixture 40 may be filled in the compressing mold, the mixture 40 is compressed to form a tablet 50 in a way that a pressure is applied on the compressing device, the pressure compressing the mixture 40 is between 10 kg/m$^2$ to 5 Mkg/m$^2$, and the pressure compressing the mixture 40 can be adjusted in accordance with a forming condition of the tablet 50 (for example, a forming density or a Young's modulus of the tablet). In addition, during a compressing process, the air in the mixture 40 can be squeezed out, and the compressing mold has a predetermined space for being filled up with the mixture 40 which is in a definite quantity so that it is convenient to produce and manufacture the tablet in a definite quantity.

Figure 4:
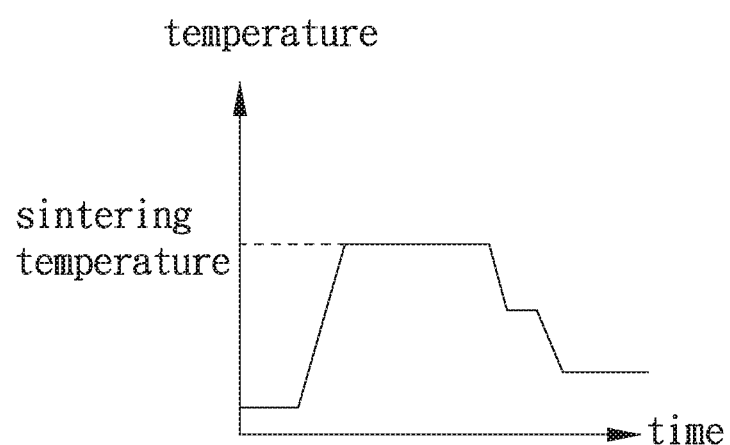
FIG. 4 is a drawing showing a temperature of another embodiment of the present invention.

The tablet 50 is sintered to form a glass phosphor body 60, and the tablet 50 is sintered to reach a sintering temperature, for example, between 350° C. to 1000° C. Specifically, the bonding agent 30 volatilizes during a sintering process. For example, the bonding agent 30 has a volatilization temperature lower than the sintering temperature, the tablet 50 reaches the volatilization temperature of the bonding agent 30 first during a heating process, the volatilization temperature is, for example, between 100° C. to 150° C., the tablet 50 continues to be heated to the sintering temperature (as shown in FIG. 3) to sinter the glass phosphor body 60 to form, and the glass phosphor body 60 has less pores and a stronger structural strength. More specifically, during the sintering process, a rigidity and a hardness of the tablet 50 are increased gradually, and a structure of the tablet 50 is compressed tightly gradually. When the bonding agent 30 is volatilized, the tablet 50 forms a structure having a high density. Please refer to FIG. 4, during the sintering process, if the tablet is not mixed with the bonding agent 30, the tablet will reach the sintering temperature directly. It is to be noted that the bonding agent 30 can elevate the yield rate that the tablet 50 is sintered to form the glass phosphor body 60. More specifically, the tablet 50 cooperates with the bonding agent 30 to be compressed, so the pores in the tablet 50 can be effectively eliminated (as described above), so when the glass phosphor body 60 is formed, the yield rate is elevated, and a manufacturing cost is reduced. Furthermore, the aluminum oxide powder 80 may be for alleviating and reducing a volumetric thermal expansion caused during the sintering process of the glass powder 10 and the phosphor powder 20 (neutralizing the thermal expansion coefficient) so as to prevent the glass phosphor body 60 from cracking. After the glass phosphor body 60 is sintered, the glass phosphor body 60 goes through an annealing processing step, and a temperature of the annealing processing may be set between 300° C. to 500° C. so that the glass phosphor body 60 can be prevented from cracking (for example, the glass phosphor body 60 can be prevented from cracking when being cut). Furthermore, the glass phosphor body 60 undergoes an annealing process to prevent the glass phosphor body 60 from cracking easily and to repair the cracks so as to elevate the yield rate.

In this embodiment, when a weight proportion of the phosphor powder 20 and the glass powder 10 is 10:90, and the bonding agent 30 is added into the phosphor powder 20 and the glass powder 10, the bonding agent 30 takes up 30% to 50% of a total volume of the mixture 40, the mixture 40 has a preferable mixing effect, the mixture 40 is preferably compressed by a pressure of 20000 kg/m$^2$ to form the tablet 50, the tablet 50 has 30% to 80% less air compared with the mixture 40, and a volume of the tablet 50 decreased when being sintered. In addition, the glass phosphor body 60 has a compact and strong structure which can improve the Young's modulus and the thermal expansion coefficient, the Young's modulus may be between 71 GPa to 75 GPa, or the forming density of the glass phosphor body 60 may be between 0.001 g/mm$^3$ to 0.004 g/mm$^3$. In actual practice, the glass phosphor body 60 may be cut to form at least one sheet body 70, and more specifically, the glass phosphor body 60 may be cut through a wire cutting device (single wire/multiple wires). In addition, the sheet body 70 can be further ground to produce a preferable surface roughness of the sheet body 70, a thickness of the sheet body 70 may be ground to be between 0.1 mm to 5 mm, and the sheet body 70 may be applied to an optical equipment to convert wavelength or filter light.

Given the above, in the method for producing sheets of glass phosphor, a bonding agent is added during a mixing process so that a mixture can be easily shaped to make a glass phosphor body be mixed uniformly, pores in the glass phosphor body can be effectively eliminated through the compressing process, and during a manufacturing process, a sintering contraction rate is decreased, the structure is strengthened, the Young's modulus is improved, a yield rate is enhanced, and a manufacturing cost is lowered.

In addition, after sintering process, the glass phosphor body undergoes an annealing process to prevent the glass phosphor body from cracking easily and to repair the cracks so as to elevate a yield rate.

While we have shown and described various embodiments in accordance with the present invention, it should be clear to those skilled in the art that further embodiments may be made without departing from the scope of the present invention.

What is claimed is:

1. A method for producing sheets of glass phosphor, including following steps of
   taking glass powder, phosphor powder and a bonding agent to mix to form a mixture, wherein the glass powder and the phosphor powder are mixed first, and then the glass powder and the phosphor powder are mixed with the bonding agent;
   compressing the mixture to form a tablet;

sintering the tablet to form a glass phosphor body;
cutting the glass phosphor body to form at least one sheet body;
wherein the bonding agent takes up 30% to 50% of a total volume of the mixture, and the bonding agent is viscous so that the mixture is flowable;
wherein after the glass phosphor body is sintered, the glass phosphor body goes through an annealing processing step, and a temperature of the annealing processing step is between 300° C. to 500° C.;
wherein the glass phosphor body has a forming density, and the forming density is between 0.001 $g/mm^3$ to 0.004 $g/mm^3$.

2. The method for producing sheets of glass phosphor of claim 1, further including a sintering temperature, the tablet being sintered to reach the sintering temperature, the sintering temperature being between 350° C. to 1000° C.

3. The method for producing sheets of glass phosphor of claim 2, wherein the bonding agent is a liquid bonding agent which is volatilizable, the bonding agent has a volatilization temperature, and the volatilization temperature is lower than the sintering temperature.

4. The method for producing sheets of glass phosphor of claim 1, wherein the bonding agent includes polymer resin, wax or vegetable oil.

5. The method for producing sheets of glass phosphor of claim 1, wherein one of the phosphor powder and the glass powder takes up 1% to 99% of a total volume of the phosphor powder and the glass powder, and the other one of the phosphor powder and the glass powder takes up the rest of the total volume.

6. The method for producing sheets of glass phosphor of claim 1, wherein a weight proportion of the phosphor powder and the glass powder is 10:90.

7. The method for producing sheets of glass phosphor of claim 1, wherein a pressure compressing the mixture is between 10 $kg/m^2$ to 5 $Mkg/m^2$.

8. The method for producing sheets of glass phosphor of claim 7, wherein the pressure compressing the mixture is 20000 $kg/m^2$.

9. The method for producing sheets of glass phosphor of claim 1, wherein the glass phosphor body has a Young's modulus, and the Young's modulus is between 71 GPa to 75 GPa.

10. The method for producing sheets of glass phosphor of claim 1, further including a step of grinding the sheet body, a thickness of the sheet body being ground to be between 0.1 mm to 5 mm.

11. The method for producing sheets of glass phosphor of claim 1, wherein the phosphor powder includes Yttrium Aluminum Garnet (YAG), nitride or silicate.

12. The method for producing sheets of glass phosphor of claim 1, wherein the glass powder includes silicate, phosphate, borate or tellurate.

13. The method for producing sheets of glass phosphor of claim 1, wherein the glass powder and the phosphor powder are mixed with aluminum oxide powder before being mixed with the bonding agent.

* * * * *